United States Patent
Froese et al.

(10) Patent No.: US 11,514,020 B2
(45) Date of Patent: Nov. 29, 2022

(54) TRACKING CHANGE DATA CAPTURE LOG HISTORY

(71) Applicant: International Business Machines Corporation, Armonk, NY (US)

(72) Inventors: Florian Hermann Froese, Zurich (CH); Luis Garces Erice, Rueschlikon (CH); Daniel Nikolaus Bauer, Zurich (CH); John G. Rooney, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/097,026

(22) Filed: Nov. 13, 2020

(65) Prior Publication Data

US 2022/0156246 A1 May 19, 2022

(51) Int. Cl.
*G06F 16/23* (2019.01)
*G06F 16/27* (2019.01)
*G06F 16/21* (2019.01)

(52) U.S. Cl.
CPC ........ *G06F 16/2358* (2019.01); *G06F 16/219* (2019.01); *G06F 16/273* (2019.01)

(58) Field of Classification Search
CPC ... G06F 16/2358; G06F 16/273; G06F 16/219
USPC ....................................................... 707/634
See application file for complete search history.

(56) References Cited

U.S. PATENT DOCUMENTS

| | | | | |
|---|---|---|---|---|
| 8,073,731 B1* | 12/2011 | Rajasenan | .......... | G06Q 10/0637 705/7.42 |
| 8,818,943 B1* | 8/2014 | McCline | ............... | G06F 16/275 707/624 |
| 8,990,155 B1* | 3/2015 | Bayer | ................... | G06F 16/178 707/610 |

(Continued)

FOREIGN PATENT DOCUMENTS

| | | | | |
|---|---|---|---|---|
| CN | 110782946 A | * | 2/2020 | ............. G16B 20/20 |
| KR | 1020190063835 A | | 10/2019 | |

OTHER PUBLICATIONS

Andreas Buckenhofer, Log-Based Change Data Capture—Lessons Learnt, Sep. 3, 2020, all pages. (Year: 2020).*

(Continued)

*Primary Examiner* — James Trujillo
*Assistant Examiner* — Antonio J Caiado
(74) *Attorney, Agent, or Firm* — Aaron N. Pontikos; Stephen R. Yoder

(57) ABSTRACT

A method includes obtaining a first snapshot of a source system and deriving a set of key-value pairs reflecting the first snapshot. A mirror operation of the source system is performed to obtain CDC change operations. The method obtains a first CDC log as a first sequence of key-value pairs. A second snapshot of the source system is obtained and a set of key-value pairs is derived, which reflects the second snapshot. The first sequence of key-value pairs is compared with the set of key-value pairs to derive corrective CDC operations, captured as a set of key-value pairs. The corrective CDC operations represent corrections to be performed (Continued)

with respect to the first sequence of key-value pairs. A second CDC log is obtained as a second sequence of key-value pairs. The corrective CDC operations ensure that the second sequence of key-value pairs are coherent with the set of key-value pairs.

20 Claims, 5 Drawing Sheets

(56) References Cited

U.S. PATENT DOCUMENTS

| 10,599,639 | B1* | 3/2020 | Forghani | G06F 16/2379 |
|---|---|---|---|---|
| 2014/0344542 | A1* | 11/2014 | Huang | G06F 16/907 |
| | | | | 711/164 |
| 2017/0249342 | A1 | 8/2017 | Dembla | |
| 2018/0041581 | A1* | 2/2018 | Klose | H04L 51/18 |
| 2018/0046551 | A1* | 2/2018 | Bourbonnais | G06F 16/2358 |
| 2018/0095952 | A1* | 4/2018 | Rehal | G06F 16/213 |
| 2018/0285201 | A1* | 10/2018 | Bangalore | G06F 11/1461 |
| 2019/0102405 | A1* | 4/2019 | Yang | G06F 16/178 |
| 2019/0179951 | A1* | 6/2019 | Brunet | H04L 9/3239 |
| 2019/0361913 | A1 | 11/2019 | Yoon | |
| 2020/0117744 | A1* | 4/2020 | Tomlinson | G06F 16/2365 |
| 2020/0167332 | A1* | 5/2020 | Mathur | G06F 11/1471 |
| 2021/0216504 | A1* | 7/2021 | Abdelnur | G06F 16/178 |

OTHER PUBLICATIONS

Bralgin, Igor, "Change Data Capture (CDC) Methods", DWH-Club. com, Sep. 1, 2011, 5 pages.

Devlin et al., "Data Warehouse: From Architecture to Implementation", Published 1996, (Abstract Only), 3 pages.

Disclosed Anonymously et al., "A Log Merge Method in Active-Active Sites", An IP.com Prior Art Database Technical Disclosure, IP.com No. IPCOM000254082D, IP.com Electronic Publication Date: May 31, 2018, 6 pages.

Kreps et al., "Kafka: a Distributed Messaging System for Log Processing", NetDB'11, Jun. 12, 2011, Athens, Greece, Copyright 2011 ACM 978-1-4503-0652-2/11/06, 7 pages.

Mathis, Christian, "Data Lakes", Datenbank-Spektrum 17, Published: Oct. 6, 2017, SpringerLink (Abstract Only), 4 pages.

Ramakrishnan et al., "Azure Data Lake Store: A Hyperscale Distributed File Service for Big Data Analytics", SIGMOD'17, May 14-19, 2017, Chicago, IL, USA, © 2017 ACM. ISBN 978-1-4503-4197-4/17/05, 13 pages.

* cited by examiner

TRACKING CHANGE DATA CAPTURE LOG HISTORY

BACKGROUND

The invention relates in general to computerized methods and computer program products for tracking change data capture (CDC) log history. In particular, it is directed to methods relying on corrective CDC operations to generate consistent CDC logs.

Most enterprise data are stored in relational data warehouses, where it is typically updated, processed, and queried, e.g., to generate actionable information for the enterprise's business. Datalakes allow data from many different sources to be combined, such that additional values can be extracted from such data. For example, the combination of weather data and supply chain data can lead to predictions about potential risks to those supply chains. Consequently, it is of interest to copy relational data from multiple different sources, ideally in real time, to many distinct storage and processing systems. In a hybrid cloud model, such systems will be running both on a company's private cloud and one or more cloud vendor's public clouds. For example, a company's sales data may be stored in a transactional system resident on the company's premises, and also be copied on to the public cloud where analytics processes can generate sales recommendations.

In Change Data Capture (CDC) systems, only the data in the source system that has actually changed are updated in the target system. A key task in these systems is to identify which parts of the data set has changed. In relational database systems, this can be efficiently achieved by inspecting the transaction log.

Typically, within a CDC system, an initial refresh/snapshot of the table is first performed into a message system such as a Kafka topic (or an MQ queue) and then all subsequent changes are read from the change log and propagated to the topics. All changes, including the initial refresh, are stored as individual messages. The CDC system can ensure the coherence between these two independent operations by noting the operation at which the first refresh was performed and guaranteeing that all operations performed after that refresh are correctly captured. Reading this topic will then allow a replica of the source database to be created at a target system. The data in the target database is defined to be coherent with respect to data of the source database when the state at the target system represents some valid state of the source system. In contrast to consistency, which is a requirement for all databases, coherence more specifically concerns replicated databases.

SUMMARY

According to a first aspect, the present invention is embodied as a method of tracking change data capture log history, or CDC log history. To start with, a first snapshot of a source system is obtained and a set $S_1$ of key-value pairs reflecting the first snapshot is derived. Then, a mirror operation of the source system is performed to accordingly obtain CDC change operations. The CDC change operations represent changes to be performed with respect to the set $S_1$ of key-value pairs. Such operations are captured as a set $S_M$ of key-value pairs. Next, a first CDC log is obtained as a first sequence $S_A$ of key-value pairs, these including the key-value pairs of the set $S_1$ and the set $S_M$. In addition, a second snapshot of the source system is obtained (after having obtained the first snapshot) and a set $S_2$ of key-value pairs is derived, which reflects the second snapshot. The first sequence $S_A$ of key-value pairs is then compared with the set $S_2$ of key-value pairs to derive corrective CDC operations, captured as a set $S_3$ of key-value pairs. The corrective CDC operations represent corrections to be performed with respect to the first sequence $S_A$ of key-value pairs. Finally, a second CDC log is obtained as a second sequence $S_B$ of key-value pairs, which include the key-value pairs of the sequence $S_A$ and the set $S_3$. The corrective CDC operations ensure that the second sequence $S_B$ of key-value pairs are, as a whole, coherent with the set $S_2$ of key-value pairs.

Preferably, the method further comprises interpreting the second sequence of key-value pairs to modify a current state of a target system, for the latter to reach a target state that is coherent with a state of the source system at a time at which the second snapshot is obtained.

According to another aspect, the invention is embodied as a computer program product for tracking CDC log history. The computer program product comprises a computer readable storage medium having program instructions embodied therewith, wherein the program instructions are executable by processing means, so as to cause the latter to perform the steps of the above method.

Computerized methods and computer program products embodying the present invention will now be described, by way of non-limiting examples, and in reference to the accompanying drawings.

BRIEF DESCRIPTION OF SEVERAL VIEWS OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which.

The accompanying drawings show simplified representations of devices or parts thereof, as involved in embodiments. Similar or functionally similar elements in the figures have been allocated the same numeral references, unless otherwise indicated.

DETAILED DESCRIPTION OF EMBODIMENTS OF THE INVENTION

The initial part of the sequence of messages in the topic corresponds to a full snapshot (corresponding to operations that are sometimes called "refresh" or "load"), while the subsequent replicating of operations is referred to as a mirror operation. The CDC system guarantees that the mirroring starts at the correct operation after the snapshot operation is completed; one may thus regard such operations as a single integrated operation, i.e., a snapshot-mirror operation.

If the snapshot-mirror operation is performed a second time on the table, then the topic that is written to must be empty. While the mirror operation is guaranteed to start after the snapshot has completed, there is no guarantee of coherence between data that is refreshed multiple times. For example, if a row is present in a table at the first refresh but not the second, it will still be present in the Kafka topic and will never be deleted.

Any resulting target table will thus be incoherent with respect to the source table. This is a consequence of the fact that data can be updated in a relational database in two ways: by performing operations on it or by performing a full snapshot. Meanwhile, a topic such as a Kafka topic would still represent such operations in the same way. Note, doing so is normal practice in practical systems. For example, databases are periodically backed-up and restored onto different machines for upgrades, maintenance, etc. The above problem is, therefore, not a mere theoretical problem, but one that an enterprise system may want to account for. Some database systems, e.g., Microsoft SQL, disable snapshot operations on a table that is in capture mode, as well as some other operations such as truncate operations.

Figure 1:
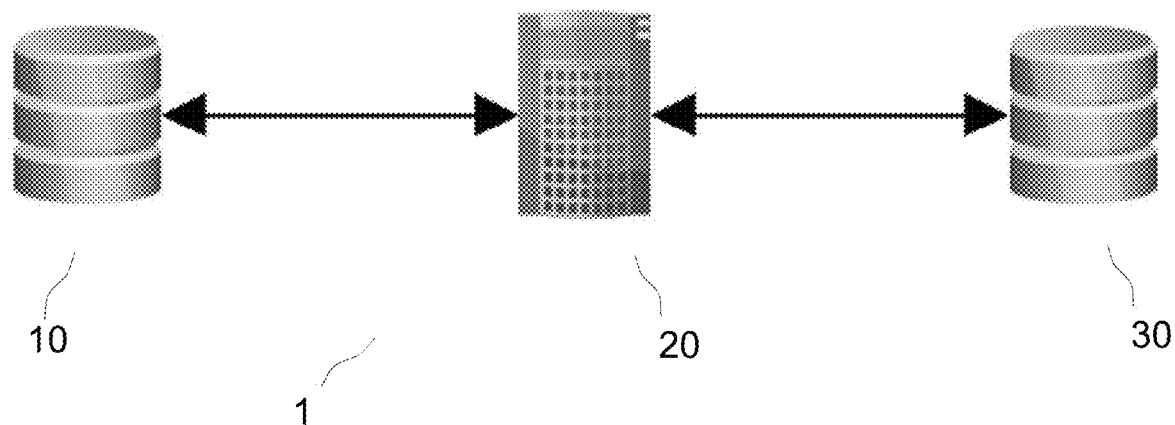
FIG. 1 schematically illustrates a CDC system interacting both with a source database system and a target database system, as in embodiments.
Figure 2:
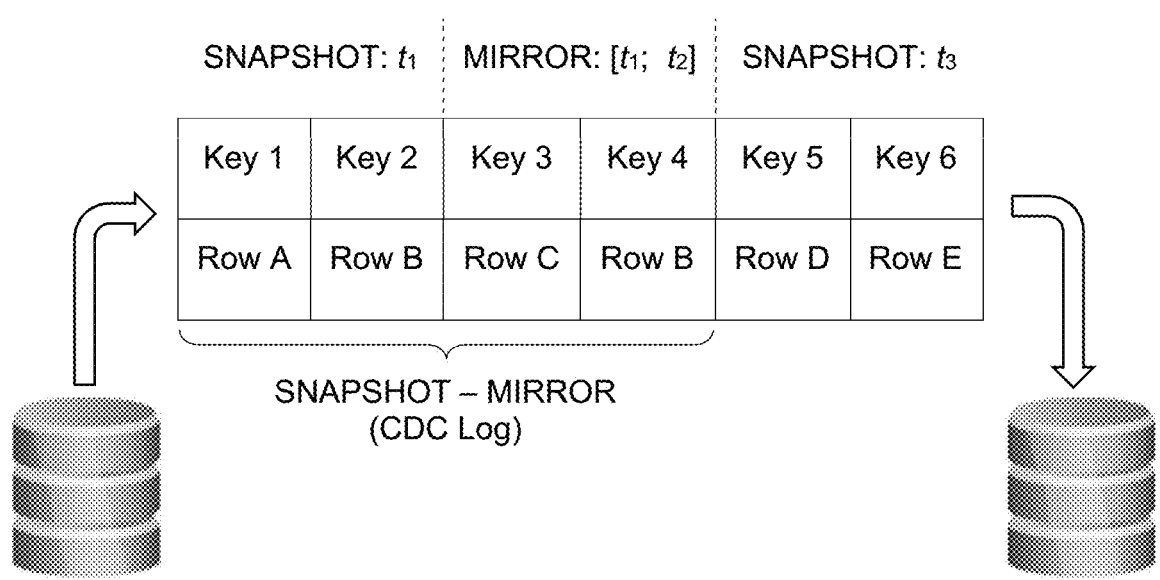
FIG. 2 is a diagram illustrating a CDC log as typically obtained with prior methods.

This problem is illustrated in FIG. 1, by way of a simple example. A snapshot is assumed to be performed at time $t_1$. As a result, the rows (Row A, Row B) corresponding to Key 1, and Key 2 are added. Mirroring takes place between times $t_1$ and $t_2$, whereby the row value of Key 1 is changed and a new row corresponding to Key 3 is added. Next, at time $t_3$, a new snapshot takes place, which causes any data found in the source database to be put into the topic. In this example, this consists of Key 3 and Key 4, i.e., Key 1 and Key 2 no longer exist in the source. However, the target database will not be coherent with respect to the source database if it is created from the values found in the topic. Indeed, the rows corresponding to Key 1 and Key 2 were never explicitly deleted from the system, hence there is no delete operation in the log.

In effect, each snapshot of a table creates a new version of that table and this must be reflected in both the (Kafka) representation of that table and any table created in the target databases derived from that representation.

One solution known in the art is to simply delete the old CDC log and start again. This has the advantage of simplicity, but requires any downstream systems reading the log to:

Recognize that the old CDC log has been deleted;
Update any downstream system correctly, e.g., a database, an elastic search index;
Switch to the new CDC log; and
Re-read all the data.

As the present inventors observed and concluded, the last point can be particularly problematic, e.g., when the source and target system are separated over a wide area network (WAN, i.e., a network with high-latency and low bandwidth) or if the target system does not support a transactional way of switching to the new CDC log after the new data is read. For example, when the source system is on an on-premise system, but the target system is on a public cloud, it is necessary to transfer the entire table over the WAN. Now, this may be prohibitively long when the table is very large, as is often the case in practice.

As noted, an approach that is often used in the art is to simply delete the old CDC log for the target and start again. Although this approach is conceptually simple, it notably requires the downstream systems reading the log to re-read all data, which can be prohibitively long in some cases. The invention resolves this problem by creating a coherent CDC log from a new snapshot and the existing CDC log. E.g., a new snapshot is performed on an existing topic, which is already in mirror mode and already contains data, while allowing the data at the target to remain coherent with respect to the source, as described below in detail.

The following description is structured as follows. First, general embodiments and high-level variants are described (sect. 1). The next section addresses more specific embodiments and technical implementation details (sect. 2 and 3). Note, the present method and its variants are collectively referred to as the "present methods". All references Sij refer to methods steps of the flowchart of FIG. 5, references $S_x$ concern sets or sequences of key-value pairs, and numeral references pertain to physical parts or components of the system 1.

1. General Embodiments and High-Level Variants

In reference to FIGS. 1-3, and 5, an aspect of the invention is first described, which concerns a method of tracking CDC log history. This method may typically be executed by a CDC system 20 or any system allowed to interact with the source system 10 and, possibly, with the target system 30 too, in order to update the latter, as in embodiments described later. In addition, this CDC system may possibly form part of the source system 10 or the target system 30. The CDC system may for instance execute on any physical or virtual machine. Note, for completeness, that several target systems may possibly be involved; FIG. 1 shows only one such target system 30, for simplicity.

According to the method, a first snapshot of a source system 10 is obtained at step S10. A set $S_1$ of key-value pairs is subsequently derived, see FIG. 3. The set $S_1$ reflects the first snapshot obtained. A mirror operation of the source system 10 is then performed at step S20. CDC change operations are accordingly obtained, wherein such operations represent changes to be performed with respect to the set $S_1$ of key-value pairs, in view of the mirror operation. Like the set $S_1$, the CDC change operations are captured as a set $S_M$ of key-value pairs. A first CDC log can accordingly be obtained S30 as a first sequence $S_A$ of key-value pairs, where the latter include the key-value pairs of both the set $S_1$ and the set $S_M$.

A second snapshot of the source system 10 is obtained at step S40, e.g., as a load operation. A set $S_2$ of key-value pairs is accordingly derived, wherein the set $S_2$ reflects the second snapshot.

The first sequence $S_A$ of key-value pairs is then compared S50 with the set $S_2$ of key-value pairs, so as to derive corrective CDC operations. The latter are captured as a set $S_3$ of key-value pairs. The corrective CDC operations represent corrections to be performed with respect to the first sequence $S_A$ of key-value pairs.

Finally, a second CDC log is obtained S60 as a second sequence $S_B$ of key-value pairs, wherein the latter include the key-value pairs of both the sequence $S_A$ and the set $S_3$. The corrective CDC operations are derived in such a manner as to ensure that the second sequence $S_B$ of key-value pairs are, as a whole, coherent with the set $S_2$ of key-value pairs.

Note, the values of the key-value pairs referred to above may comprise any data or dataset; they preferably comprise structured data. Such values typically correspond to database rows, i.e., rows of the source system 10. The terminology "key-value pairs" should be understood in a broad sense in this document; it refers to any association of data (value) with a corresponding identifier (key). If necessary, the present methods may further cause to generate a unique key, should it be missing in the source system 10. This way, one makes sure that suitable keys will always be available for each key-value pair of the sets $S_1$, $S_2$, $S_3$, the sequence $S_A$, and/or the sequence $S_B$. Such unique keys may for instance be generated by hashing contents of the corresponding values, for example.

Figure 3:
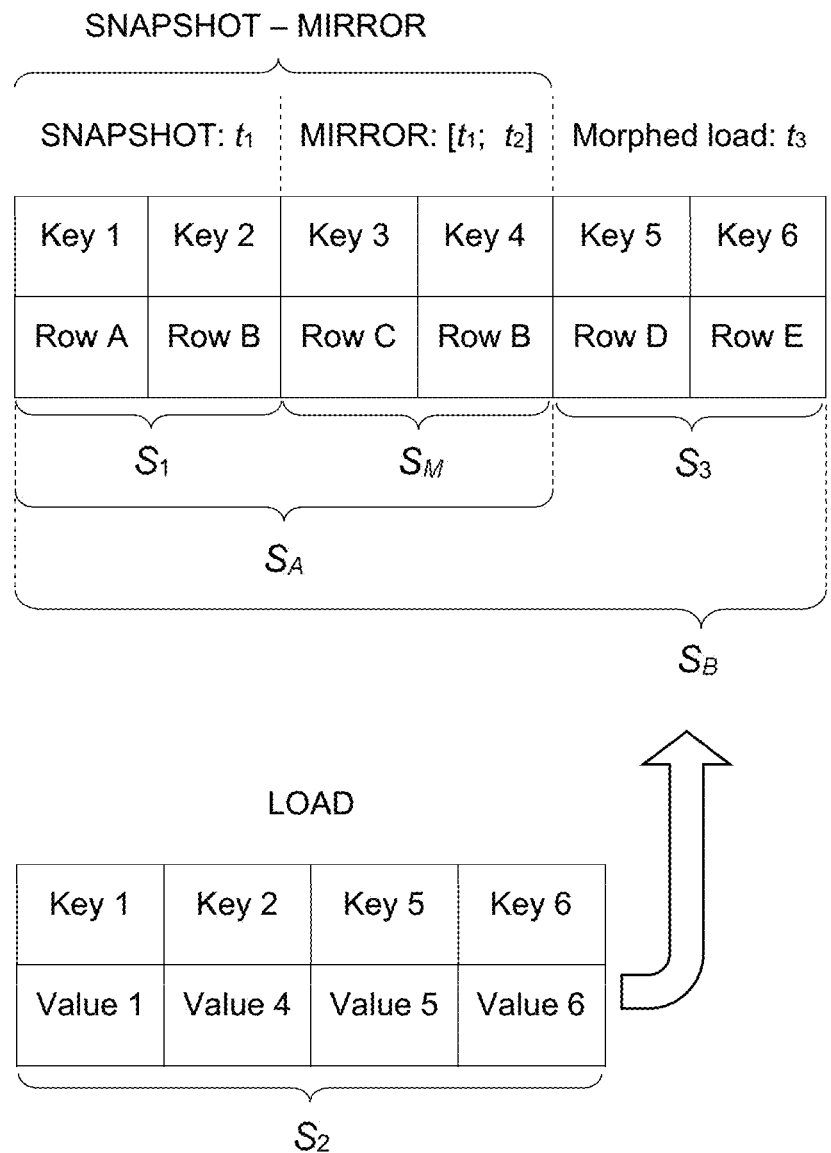
FIG. 3 is a diagram illustrating how coherent CDC logs can be generated according to embodiments.

For example, the first snapshot may be obtained at a first time $t_1$, while the mirror operation is performed during a time period ranging from the first time $t_1$ to a second time $t_2$, the latter posterior to the time $t_1$, as assumed in FIG. 3. The second snapshot will typically be obtained at a third time $t_3$, posterior to $t_2$. Note, the present approach also works if the second snapshot is obtained at a time $t_3$ that is posterior to $t_1$, without necessarily be posterior to $t_2$. In all cases, the target system 30 may eventually reach a target state that is coherent with the state of the source system 10 at time $t_3$.

After a mirror operation S20, the CDC system is in a mirror state, ready for a subsequent load operation. The subsequent load operation S40, however, may possibly cause the CDC system 20 to load a state corresponding to a different state, i.e., incoherent with the state of the source system as of after the mirror operation S20. For example, the source system 10 may, in the meantime, have been reverted to a backup state, which may be inconsistent with the state of the system 10 right after the mirror operation S20.

However, thanks to the corrective operations captured S50 as key-value pairs $S_3$, the second sequence $S_B$ of key-value pairs is coherent with the second snapshot corresponding to key-value pairs $S_2$. That is, the second sequence can be interpreted so as to cause a target system 30 to reach a state reflecting the second snapshot, i.e., corresponding to the state of the source system 10 at time $t_3$.

Thus, the present method allows a coherent CDC log $S_B$ to be created from the newest snapshot $S_2$ and the existing CDC log $S_1$ by generating a series of corrective CDC operations. Such corrective operations, after processing, lead to the target system 30 being in the same state as if it had read the new snapshot $S_2$. Yet, as only the CDC messages that correspond to the values (e.g., rows) that have changed are added, when the difference between the new snapshot $S_2$ and the first CDC log $S_1$ is small (which is the most frequent case in practice), the amount of data to be processed by interpreting the coherent CDC log $S_B$ is much smaller (potentially several orders of magnitude smaller) than if the target system 30 had to read entirely the new snapshot $S_2$, as in prior approaches. In addition, the target system 30 does not need to be aware that it needs to take some specific action at the target or switch topics.

Another advantage of the proposed method is that it allows different types of operations to be interleaved, while still making it possible to generate consistent CDC logs. That is, databases tables can be modified in two entirely different ways: via row operations (e.g., inserts, updates, etc.) and via table operations (e.g., refresh, truncate, etc.), as known per se. A prior CDC log tracking the first type of operations semantically cannot be directly combined with changes made from the second as data coherency is compromised. However, the present methods allow the two types of operations evoked above to be interleaved while still generating a consistent CDC log. This is achieved by changing the old CDC log state into a new coherent CDC log state, a mechanism that is also referred to as "morphing" in the present document, as it is preferably incrementally performed.

Figure 5:
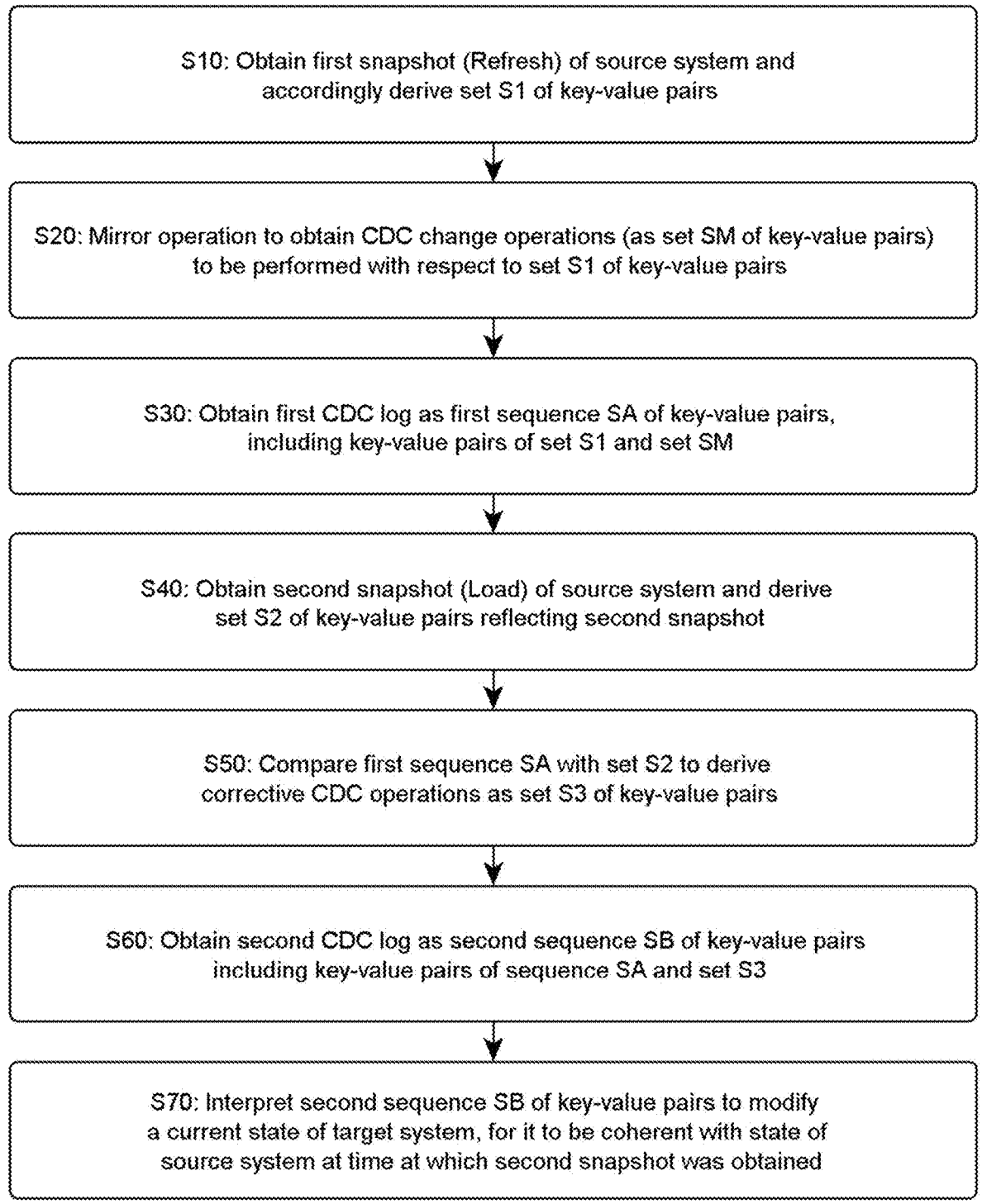
FIG. 5 is a flowchart illustrating high-level steps of a method of tracking CDC log history, according to embodiments.

As further seen in the flow of FIG. 5, the present methods may further cause (e.g., the CDC system 20 or a target system 30) to interpret S70 the second sequence of key-value pairs, so as to modify the current state of the target system 30. This, in turn, allows the target system 30 to reach a target state that is coherent with the state of the source system 10 at (i.e., as of) the time at which the second snapshot was obtained, owing to the corrective operations included in the second sequence $S_B$.

The second sequence $S_B$ of key-value pairs is preferably obtained S60 as an ordered sequence, in which the key-value pairs of the set $S_1$ precedes the key-value pairs of the set $S_M$, which themselves precedes the key-value pairs of the set $S_3$, as shown in FIG. 3. Similarly, the first sequence $S_A$ of key-value pairs may be obtained as an ordered sequence when forming S30 the first CDC log. Ordered sequences allow comparisons to be performed in linear time.

In embodiments, the corrective CDC operations are incrementally obtained S50, i.e., each operation reflects one change at a time. Thus, the second CDC log may possibly include one or more of each (or any) of a DELETE operation, an INSERT operation, and an UPDATE operation. Each of these operations are captured as a key-value pair. In practice, however, said corrective CDC operations will typically comprises a plurality of DELETE, INSERT, and UPDATE operations.

As said, the values of all of the key-value pairs evoked above typically correspond to database rows of the source system 10. So, in embodiments, if a given database row that is indexed in the first CDC log is not reflected in the second snapshot, the comparison performed at step S50 (i.e., between the first sequence $S_A$ and the set $S_2$) may cause to derive a corrective CDC operation as a DELETE operation for that given database row. Similarly, if a given database row as indexed in the first CDC log is reflected in the second snapshot but a non-key field of this row is altered, then the comparison S50 may cause to derive a corrective CDC operation as a corresponding UPDATE operation, so as to update this non-key field. Also, if a given database row (as reflected in the second snapshot) is not indexed in the first CDC log, then the comparison S50 may cause to derive one of said corrective CDC operations as an INSERT operation for that given row. However, if a given database row (as indexed in the first CDC log) is identically reflected in the second snapshot, then the comparison S50 does not produce any corrective CDC operation for that row.

Any suitable algorithm may be contemplated to derive S50 the corrective CDC operations. Yet, this algorithm is preferably selected based on the extent of similarity between the first sequence $S_A$ and the set $S_2$. Thus, in embodiments, step S50 further comprises evaluating the degree of similarity between $S_A$ and $S_2$, so as to select a most appropriate algorithm to derive the corrective CDC operations.

Interestingly, the present approach is compatible with sorted compactions of the CDC logs, as discussed in detail in section 2. Plus, the present approach can still be performed by a CDC system configured to partition data into different partitions. In that case, the database rows need be mapped according to said different partitions of the CDC system, and based on the key-value pairs.

Next, according to another aspect, the invention can be embodied as a computer program product. The computer program product comprises a computer readable storage medium having program instructions embodied therewith.

Such program instructions may for instance be executed by processing means 105, e.g., of a CDC system 20. They may, in variants, be executed on one or more physical machines, suitably connected, or by virtual machines, e.g., in a cloud environment, if needed. In all cases, such instructions cause the processing means to perform steps such as described above. Additional considerations regarding computer program products and computerized systems are provided in section 3.

The above embodiments have been succinctly described in reference to the accompanying drawings and may accommodate a number of variants. Several combinations of the above features may be contemplated. Examples are given in the next section.

2. Specific Embodiments

This sections describes embodiments that allow a coherent CDC log to be created based on a new snapshot and an existing CDC log by generating a synthetic series of CDC changes that, after processing, lead to the target system being in the same state as if it had read the new snapshot entirely.

Such embodiments essentially involve adding only the CDC messages that correspond to the rows that have changed. Thus, small difference between the new snapshot and the CDC log only require small amounts of data to be read by the downstream systems, and allow the fact that the target system need not be aware that it has to take some specific action at the target or switch topics.

Without loss of generality, we may assume that each row in the table (and therefore each message in the topic) can be identified with a unique key. As noted in the previous section, if such a key does not exist, then it can be created on the fly by, e.g., hashing contents of the row.

As it may be realized, the comparison S50 of the CDC log with the new snapshot will, in practice, lead to one of the following cases:

- A row exists in the old CDC log, but not in the new snapshot;
- The row exists in both and is the same;
- The row exists in both, but non-key fields have been altered in the snapshot; and
- The row only exists in the snapshot.

In the first case, a synthetic DELETE message can be created in the CDC log for that row. The second case does not require any action as the row is already present in the CDC log. In the third case, a synthetic UPDATE message can be created in the CDC log. In the fourth case, a synthetic INSERT message can be created in the CDC log.

This, in effect, reduces the snapshot to a certain number of operations. All necessary operations are added to the CDC log all necessary operations. The latter produce the same final state in the target system as would be produced if the target system had read only the snapshot alone.

The CDC system may for instance store the rows in key order in the CDC log. Similarly, the snapshot can be created with the rows in key order. This, in turn, allows the first part of the CDC log and the snapshot to be compared in linear time. The mirror part of the CDC log can be handled independently.

In a system like Kafka, data is divided across multiple different partitions. In this case, operations concerning a specific row are always stored on the same partition. This can be achieved by mapping rows to partitions based on the key values. Advantageously, such a solution can be parallelized on a per-partition basis to ensure scalability.

Preferably, the method recognizes the degree of similarity between the snapshot and the existing CDC log to choose the most appropriate algorithm, for example between those defined in Algorithm 1 and 2. It may notably do this by retaining the keys of the rows that are added during the mirroring phase in a given structure, here called "mirrorSet", and then using the ratio of this to the length of the old CDC log to choose the most appropriate algorithm. For instance, when this ratio is small and care is taken to write the initial snapshot in key order, the calculation of the synthetic operations can be calculated in linear time.

A particularly preferred embodiment is reflected in the (pseudo-code) algorithm 1 below.

Algorithm 1. Morphing an existing CDC log to match a given snapshot.

```
function MORPHCDCLOG(log, refreshSize, snapshot, mirrorKeys)
    // Appends to the log to make it consistent with snapshot
    snapshotIndex ← 0
    logIndex ← 0
    toBeKept ← emptySet
    initialLogLength ← log.length
    while logIndex < refreshSize do
        if ( snapshotIndex = snapshot.length ) then
            break
        end if
        snapShotRecord ← snapshot[snapshotIndex]
        logRecord ← log[logIndex]
        if (snapShotRecord.key > logRecord.key) then
            // logRecord is no longer present.
            log.append(DELETE(logRecord.key))
            logIndex++
        else
            if (snapShotRecord = logRecord) then
                // ignore if not in mirror set
                if (mirrorKeys.contains(snapShotRecord.key)) then
                    log.append(Record(UPSERT, snapShotRecord))
                    toBeKept.add(snapShotRecord.key)
                end if
            else
                // Add new snapshot record.
                log.append(Record(UPSERT, snapShotRecord))
                toBeKept.add(snapShotRecord.key)
            end if
            snapshotIndex++
            if (snapShotRecord.key = logRecord.key) then
                logIndex++
            end if
        end if
    end while
    // Delete remainder of log excluding the updates.
    while (logIndex < initialLogLength) do
        logRecord ← log[logIndex++]
        if ! toBeKept.contains(logRecord.key) then
            log.append(DELETE(logRecord.key))
        end if
    end while
    // Add what remains of the snapshot
    while (snapshotIndex < snapshot.size) do
        snapShotRecord ← snapshot[snapshotIndex++]
        log.append(snapShotRecord)
    end while
end function
```

Additional technical details can be noted. If the mirrorSet is large compared to the old CDC log the algorithm of the embodiment captured in Algorithm 1 above may become inefficient because while the snapshot part of the log is sorted the mirror part is not. In that respect, modern log systems are equipped with a method called "compaction" to compact the snapshot part and the mirror part so that a new snapshot part will be created. A method (hereafter the sorted compaction method) that is compatible with compaction and nevertheless allows sorted snapshots is described in Algorithm 2 below.

Figure 4A:
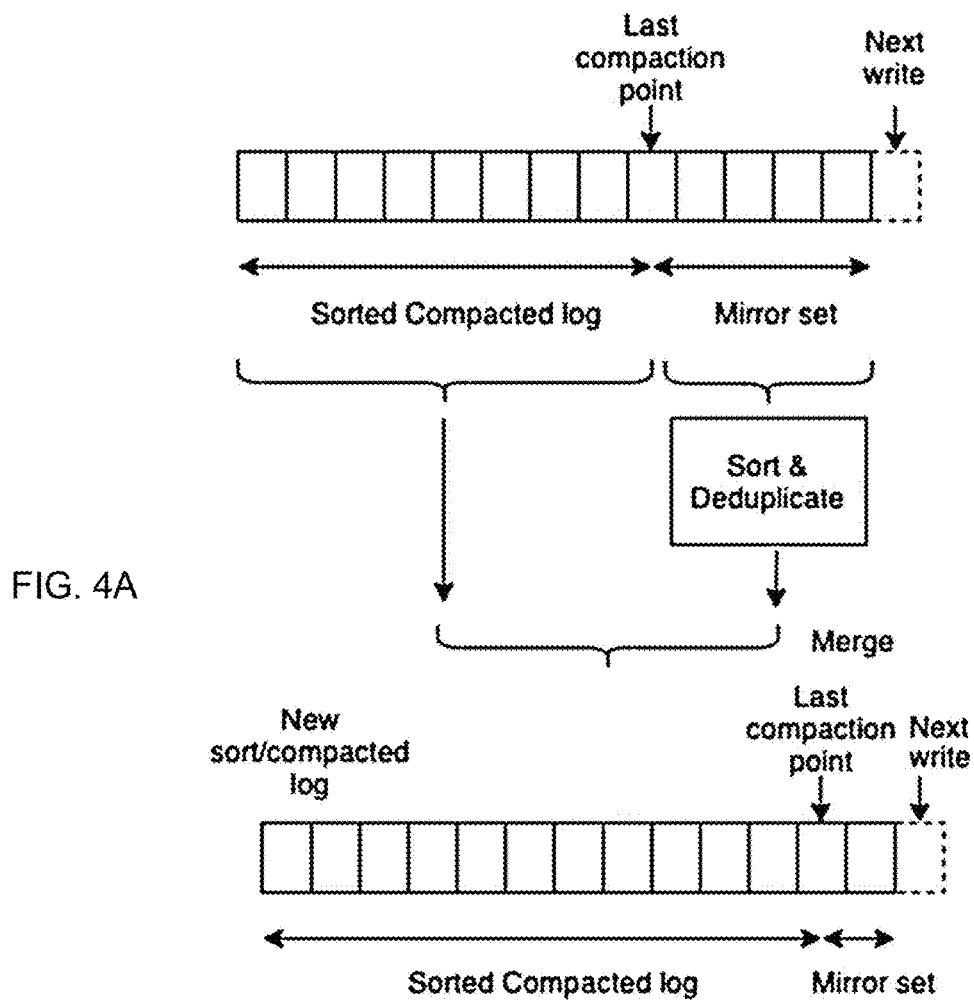
FIGS. 4A and 4B are additional diagrams illustrating a method for generating coherent CDC logs that is compatible with sorted compactions of the CDC logs, as in embodiments.
Figure 4B:
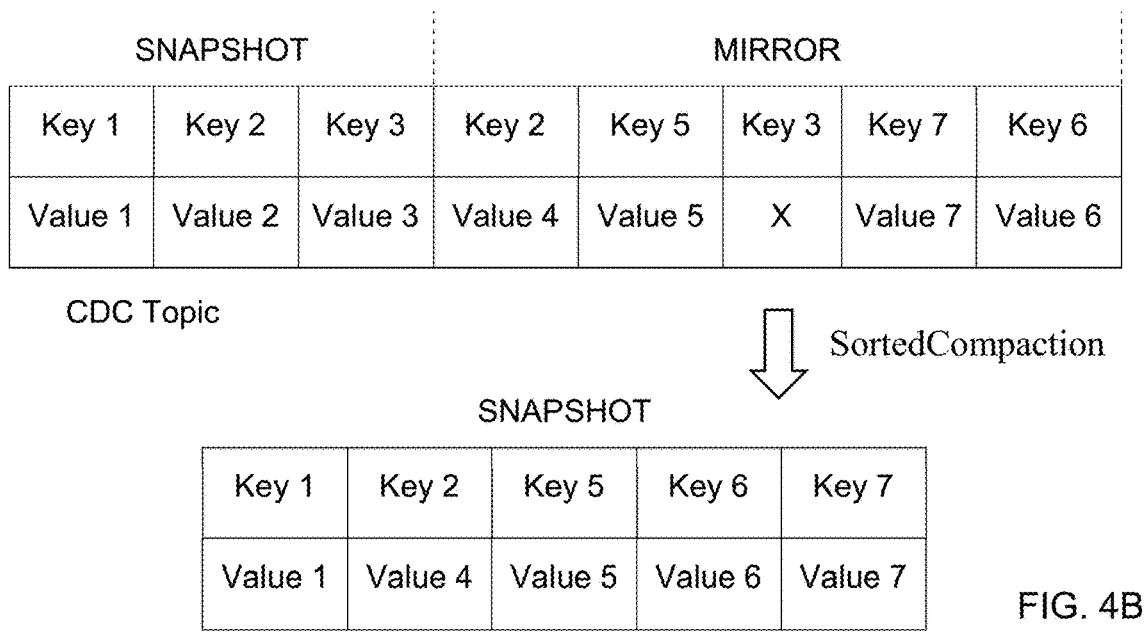

During the compaction consumers of the topic cannot read the compacted log or the mirrorSet marked for compaction. New records can still be added to the topic and read from it as long as the algorithm does not change offsets for new data. FIG. 4A describes the flow of the sorted compaction method and FIG. 4B shows an example on a topic. The last compaction point in FIG. 4A describes the offset of the log up until the point the log has been sorted and compacted. The mirror set may contain unsorted and duplicate key entries. The goal of the sorted compaction is to compact the current sorted compacted log (a snapshot) and the mirror set (new update) into a newly sorted compacted log. In order to do this, the method first sorts and deduplicates the mirror set. Duplication is handled in a way that for multiple records with the same key the one with the highest offset is taken. After a sort and duplication, the mirror set becomes basically another sorted compacted log that can be merged with the original snapshot, wherein the same merging rule applies that for two same keys the one with the higher offset is taken, which will always be the value of the mirror set as those have been added last. This is similar to the merge phase of a merge sort algorithm. After the algorithm shown in Algorithm 2 has been executed the snapshot and mirror definitions have changed; the new snapshot becomes the newly sorted compacted log and the mirror set are the new changes that were added after the algorithm started. Complexity for the sort compaction is O(m log m) for sorting the mirrorSet and O(m+n) for merging it with compactedLog.

Algorithm 2. Computing the new compacted and sorted CDC log.

```
function SORTEDCOMPACTION(compactedLog,mirrorSet)
    //Creates a new sorted and compacted CDC log from the already compacted log
    and the mirrorSet
    newLog ← emptyFile
    // Sort and deduplicate mirrorSet. Deduplicate takes last value for a key
    sortedMirrorSet ← deduplicate(sort(mirrorSet))
    logIndex ← 0
    mirrorIndex ← 0
    cLength ← compactedLog:length
    while logIndex < cLength do
        logKey ← compactedLog[logIndex].key
        if mirrorIndex >= sortedMirrorSet.size then
            newLog.append(compactedLog[logIndex])
            logIndex++
            continue
        end if
        mirrorKey ← sortedMirrorSet[mirrorIndex].key
        if logKey < mirrorKey then
            newLog.append(compactedLog[logIndex])
        else
            if sortedMirrorSet[mirrorIndex].value ! = null then
                newLog.append(sortedMirrorSet[mirrorIndex]))
            else
                // Do nothing. Compact out delete
            end if
            mirrorIndex++
            if logkey > mirrorKey then
                continue
            end if
        end if
        logIndex++
    end while
    // Add the rest of the records from mirrorSet to newLog
    while mirrorIndex++ < sortedMirrorSet.length do
        newLog.append(sortedMirrorSet[mirrorIndex]))
    end while
end function
```

3. Technical Implementation Details

3.1 Computerized Systems and Devices

Computerized systems and devices can be suitably designed for implementing embodiments of the present invention as described herein. In that respect, it can be appreciated that the methods described herein are largely non-interactive and automated. In exemplary embodiments, the methods described herein can be implemented either in an interactive, a partly-interactive, or a non-interactive system. The methods described herein can be implemented in software, hardware, or a combination thereof. In exemplary embodiments, the methods proposed herein are implemented in software, as an executable program, the latter executed by suitable digital processing devices. More generally, embodiments of the present invention can be implemented wherein virtual machines and/or general-purpose digital computers, such as personal computers, workstations, etc., are used.

Figure 6:
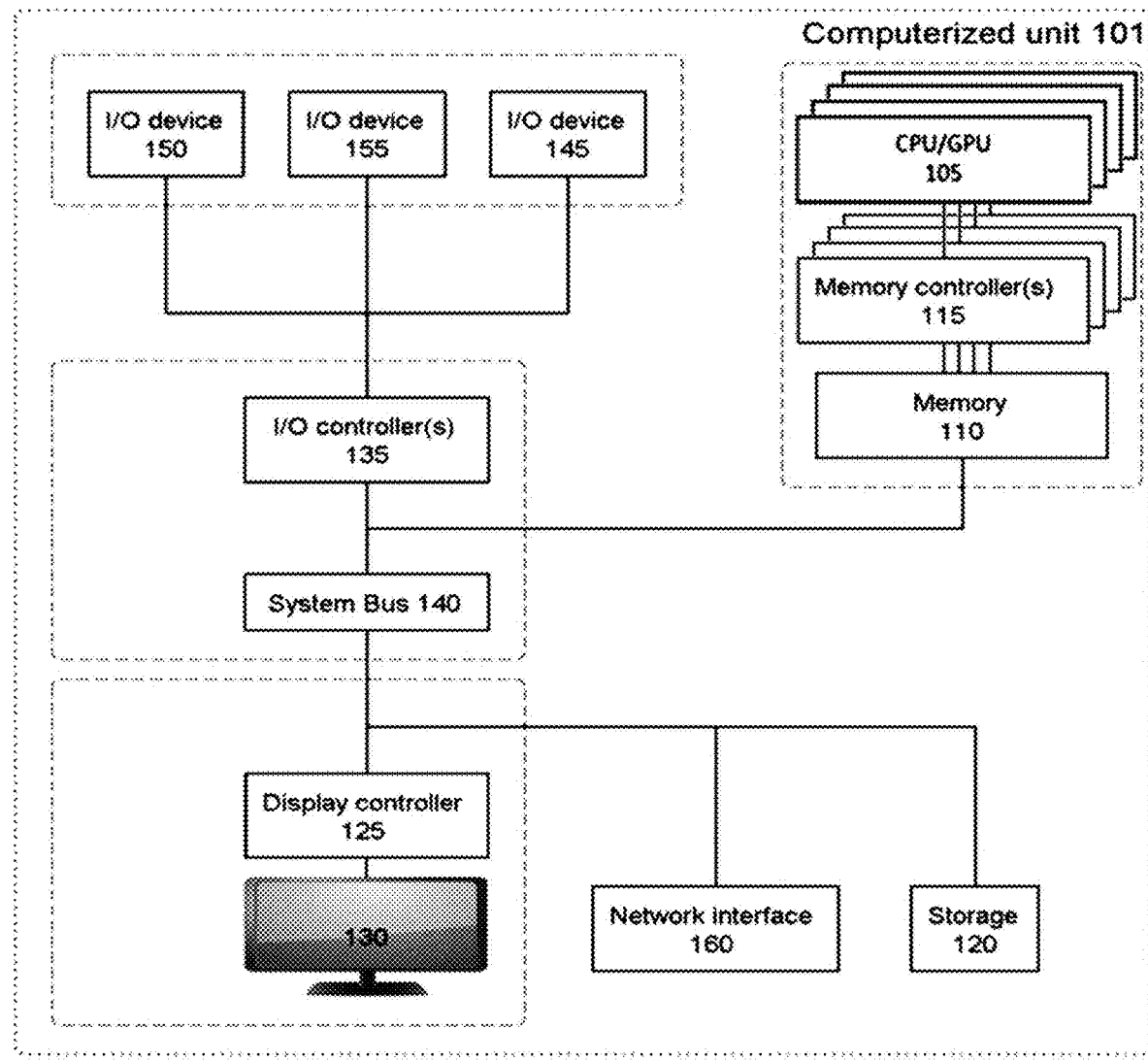
FIG. 6 schematically represents a general-purpose computerized system, suited for implementing one or more method steps as involved in embodiments of the invention.

For instance, FIG. 6 schematically represents a computerized unit 101 (e.g., a general- or specific-purpose computer), which may possibly interact with other, similar units, so as to be able to perform steps according to the present methods.

In exemplary embodiments, in terms of hardware architecture, as shown in FIG. 6, each unit 101 includes at least one processor 105, and a memory 110 coupled to a memory controller 115. Several processors (CPUs, and/or GPUs) may possibly be involved in each unit 101. To that aim, each CPU/GPU may be assigned a respective memory controller, as known per se.

One or more input and/or output (I/O) devices 145, 150, 155 (or peripherals) are communicatively coupled via a local input/output controller 135. The input/output controller 135 can be coupled to or include one or more buses and a system bus 140, as known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processors 105 are hardware devices for executing software instructions. The processors 105 can be any custom made or commercially available processor(s). In general, they may involve any type of semiconductor-based microprocessor (in the form of a microchip or chip set), or generally any device for executing software instructions.

The memory 110 typically includes volatile memory elements (e.g., random-access memory), and may further include nonvolatile memory elements. Moreover, the memory 110 may incorporate electronic, magnetic, optical, and/or other types of storage media. Additional storage may be provided via storage 120.

Software in memory 110 may include one or more separate programs, each of which comprises executable instructions for implementing logical functions. In the example of FIG. 6, instructions loaded in the memory 110 may include instructions arising from the execution of the computerized methods described herein in accordance with exemplary embodiments. The memory 110 may further load a suitable operating system (OS) 111. The OS 111 essentially controls the execution of other computer programs or instructions and provides scheduling, input-output control, file and data management, memory management, and communication control and related services.

Possibly, a conventional keyboard and mouse can be coupled to the input/output controller 135. Other I/O devices 140-155 may be included. The computerized unit 101 can further include a display controller 125 coupled to a display 130. Any computerized unit 101 will typically include a network interface or transceiver 160 for coupling to a network, to enable, in turn, data communication to/from other, external components, e.g., other units 101.

The network transmits and receives data between a given unit 101 and other devices 101. The network may possibly be implemented in a wireless fashion, e.g., using wireless protocols and technologies, such as Wifi, WiMax, etc. The network may notably be a fixed wireless network, a wireless local area network (LAN), a wireless wide area network (WAN), a personal area network (PAN), a virtual private network (VPN), an intranet or other suitable network system and includes equipment for receiving and transmitting signals. Preferably though, this network should allow very fast message passing between the units.

The network can also be an IP-based network for communication between any given unit 101 and any external unit, via a broadband connection. In exemplary embodiments, network can be a managed IP network administered by a service provider. Besides, the network can be a packet-switched network such as a LAN, WAN, Internet network, an Internet of things network, etc.

3.2 Computer Program Products

The present invention may be a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, systems, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

3.3 Clouds

Computations performed according to the present methods may possibly be provided as a cloud service. However, it is to be understood that implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A method of tracking change data capture (CDC) log history, the method comprising:
    obtaining a first snapshot of a source system and deriving a set $S_1$ of key-value pairs reflecting the first snapshot;
    performing a mirror operation of the source system by replicating operations captured by the first snapshot, wherein the mirror operation yields one or more outcomes in the source system;

obtaining CDC change operations representing changes to be performed with respect to the set $S_1$ of key-value pairs which reflect the one or more outcomes of the mirror operation, wherein the CDC change operations are captured as a set $S_M$ of key-value pairs;

obtaining a first CDC log as a first sequence $S_A$ of key-value pairs including the key-value pairs of the set $S_1$ and the set $S_M$;

obtaining a second snapshot of the source system and deriving a set $S_2$ of key-value pairs reflecting the second snapshot;

comparing the first sequence $S_A$ of key-value pairs with the set $S_2$ of key-value pairs to derive corrective CDC operations as a set $S_3$ of key-value pairs, the corrective CDC operations representing corrections to be performed with respect to the first sequence $S_A$ of key-value pairs; and obtaining a second CDC log as a second sequence $S_B$ of key-value pairs including the key-value pairs of the sequence $S_A$ and the set $S_3$, wherein the corrective CDC operations ensure that the second sequence $S_B$ of key-value pairs are, as a whole, coherent with the set 52 of key-value pairs.

2. The method according to claim 1, wherein
the method further comprises interpreting the second sequence of key-value pairs to modify a current state of a target system to reach a target state coherent with a state of the source system at a time at which the second snapshot is obtained.

3. The method according to claim 1, wherein
the second sequence $S_B$ of key-value pairs is obtained as an ordered sequence, whereby the key-value pairs of the set $S_1$ precedes the key-value pairs of the set $S_M$, which themselves precedes the key-value pairs of the set $S_3$.

4. The method according to claim 1, wherein
said corrective CDC operations comprises one or more DELETE operations, each captured as a key-value pair.

5. The method according to claim 1, wherein
said corrective CDC operations comprises one or more INSERT operations, each captured as a key-value pair.

6. The method according to claim 1, wherein
said corrective CDC operations comprises one or more UPDATE operations, each captured as a key-value pair.

7. The method according to claim 1, wherein
said corrective CDC operations comprises at least one of each of the following operations: a DELETE operation, an INSERT operation, and an UPDATE operation, each captured as a key-value pair.

8. The method according to claim 1, wherein
values of all of said key-value pairs correspond to database rows of the source system.

9. The method according to claim 8, wherein
a given database row that is indexed in the first CDC log is not reflected in the second snapshot, whereby comparing the first sequence $S_A$ with the set $S_2$ causes to derive one of said corrective CDC operations as a DELETE operation for that given database row.

10. The method according to claim 8, wherein
a given database row that is indexed in the first CDC log is reflected in the second snapshot, albeit with a non-key field being altered, whereby comparing the first sequence $S_A$ with the set $S_2$ causes to derive one of said corrective CDC operations as a corresponding UPDATE operation for that non-key field.

11. The method according to claim 8, wherein
a given database row that is reflected in the second snapshot is not indexed in the first CDC log, whereby comparing the first sequence $S_A$ with the set $S_2$ causes to derive one of said corrective CDC operations as a corresponding INSERT operation for that given row.

12. The method according to claim 8, wherein
a given database row that is indexed in the first CDC log is identically reflected in the second snapshot, whereby comparing the first sequence $S_A$ with the set $S_2$ causes to derive no corrective CDC operation for that given row.

13. The method according to claim 1, wherein
the method further comprises obtaining a sorted compaction of the first CDC log.

14. The method according to claim 1, wherein
the method is performed by a CDC system configured to partition data into different partitions.

15. The method according to claim 14, wherein
the method further comprises mapping the database rows according to said different partitions of the CDC system, based on the key-value pairs.

16. The method according to claim 1, wherein
comparing the first sequence $S_A$ with the set $S_2$ further comprises evaluating a degree of similarity between the first sequence $S_A$ and the set $S_2$, whereby said corrective CDC operations are derived based on an algorithm selected according to the degree of similarity evaluated.

17. The method according to claim 1, wherein
the method further comprises generating a unique key for each of one or more of the key-value pairs of one or more of the set $S_1$, the set $S_2$, the set $S_M$, the sequence $S_A$, the set $S_3$, and the sequence $S_B$.

18. A computer program product for tracking change data (CDC) capture log history:
one or more computer readable storage media and program instructions stored on the one or more computer readable storage media, the program instructions comprising instructions to:
obtain a first snapshot of a source system and deriving a set $S_1$ of key-value pairs reflecting the first snapshot;
perform a mirror operation of the source system by replicating operations captured by the first snapshot, wherein the mirror operation yields one or more outcomes in the source system;
obtain CDC change operations representing changes to be performed with respect to the set $S_1$ of key-value pairs which reflect the one or more outcomes of the mirror operation, wherein the CDC change operations are captured as a set $S_M$ of key-value pairs;
obtain a first CDC log as a first sequence $S_A$ of key-value pairs including the key-value pairs of the set $S_1$ and the set $S_M$;
obtain a second snapshot of the source system and deriving a set $S_2$ of key-value pairs reflecting the second snapshot;
compare the first sequence $S_A$ of key-value pairs with the set $S_2$ of key-value pairs to derive corrective CDC operations as a set $S_3$ of key-value pairs, the corrective CDC operations representing corrections to be performed with respect to the first sequence $S_A$ of key-value pairs; and
obtain a second CDC log as a second sequence $S_B$ of key-value pairs including the key-value pairs of the sequence $S_A$ and the set $S_3$, wherein the corrective CDC operations ensure that the second sequence $S_B$ of key-value pairs are, as a whole, coherent with the set $S_2$ of key-value pairs.

19. The computer program product according to claim 18, wherein
  the program instructions further comprise instructions to interpret the second sequence of key-value pairs and cause a target system to reach a state reflecting the second snapshot.

20. The computer program product according to claim 18, wherein
  the program instructions further comprise instructions to obtain the second sequence $S_B$ of key-value pairs as an ordered sequence, whereby the key-value pairs of the set $S_1$ precedes the key-value pairs of the set $S_M$, which themselves precedes the key-value pairs of the set $S_3$.

\* \* \* \* \*